United States Patent [19]

Marchessault et al.

[11] 4,121,028

[45] Oct. 17, 1978

[54] PRESSURE SENSITIVE ADHESIVE COMPOSITION

[75] Inventors: Richard G. Marchessault, Louisville; Thomas P. Carter, Jr., Jeffersontown; Martin M. Williams, Louisville, all of Ky.

[73] Assignee: Celanese Polymer Specialties Company, Louisville, Ky.

[21] Appl. No.: 812,880

[22] Filed: Jul. 5, 1977

[51] Int. Cl.² ............................ C08F 8/32; C08F 8/42
[52] U.S. Cl. .................................. 526/48.1; 526/52.2
[58] Field of Search ............................ 526/48.1, 52.2

[56] References Cited

U.S. PATENT DOCUMENTS

| 3,532,708 | 10/1970 | Blance | 260/31.2 |
| 3,740,366 | 6/1973 | Sanderson et al. | 260/29.6 M |
| 3,769,254 | 10/1973 | Anderson et al. | 260/33.4 PQ |
| 3,886,126 | 5/1975 | McKenna | 260/31.2 N X |
| 3,928,667 | 12/1975 | Carlos et al. | 260/29.6 H X |
| 4,005,247 | 1/1977 | Graham | 526/15 |

*Primary Examiner*—William F. Hamrock
*Attorney, Agent, or Firm*—Herbert P. Price; K. A. Genoni; T. J. Morgan

[57] ABSTRACT

The stability, particularly in the presence of unprotected ferrous metal surfaces, of pressure-sensitive adhesive compositions, made from a carboxylic acid containing acrylic polymer and chelate esters of orthotitanic acid, is improved by the addition of a small amount of a tertiary amine.

7 Claims, No Drawings

PRESSURE SENSITIVE ADHESIVE COMPOSITION

BACKGROUND OF THE INVENTION

The field of art to which this invention pertains is adhesive compositions, particularly those compositions based on solid polymers in admixture with titanium chelate catalysts.

Pressure-sensitive adhesives, which are normally tacky materials adherent upon application of light pressure, are desirable in a number of industrial applications because they can be used with various materials and are easily adapted to production line techniques. In order to function satisfactorily as a pressure-sensitive adhesive, a composition must provide a combination of properties including good tack, adhesion and cohesive strength, and must adhere instantaneously when applied to substrates of differing surface characteristics. To be useful in many industrial applications, the bond obtained by the use of the adhesive must have sufficient strength to remain firm over relatively long periods and under different and sometimes severe environmental conditions.

Most pressure-sensitive adhesives, however, have low relative strength as compared, for instance, to thermosetting resin adhesives, because the desired tack and adhesive properties are ordinarily inconsistent with the high level of cohesive strength obtained with other types of thermosetting resin adhesive polymers. Because of this, attempts to provide pressure-sensitive adhesives having improved cohesive strengths by modifying the resin composition have not proved to be satisfactory with continuing problems being the tendency of the adhesive to lose strength upon aging and the unsatisfactorily low tack and adhesion which tend to be found with higher strength adhesives of this type.

Pressure-sensitive adhesives having improved cohesive strength properties are described in U.S. Pat. Nos. 3,769,254, 3,886,126 and 4,005,247. The improved strength properties are obtained by using, as the adhesive polymer, an acrylic polymer containing active hydrogen moieties and crosslinking the polymer by reacting with metal alkoxides. Preferred metal alkoxides are the titanate esters, and particularly the chelate esters of orthotitanic acid. However, it has been found that when the pressure-sensitive adhesive compositions which contain chelate esters of orthotitanic acid are placed in contact with unprotected iron or steel surfacess, highly colored iron complexes can form which render the adhesive unsuitable for many commercial applications. The adhesive also can cause corrosion of the metal surface and, in many instances, gelation of the adhesive polymer occurs at the metal surface.

SUMMARY OF THE INVENTION

This invention is directed to pressure-sensitive adhesive compositions. In particular, this invention is directed to pressure sensitive adhesive compositions made from acrylic polymers plus chelate esters of orthotitanic acid.

By this invention pressure-sensitive adhesive compositions are prepared which have improved stability when in contact with unprotected surfaces of ferrous metals. These improved compositions are obtained by adding a tertiary amine to an organic solution of an acrylic interpolymer containing an interpolymerized carboxylic acid and a chelate ester of orthotitanic acid, the tertiary amine being added in the amount of 0.01 to 1.5 equivalents of tertiary amine for each equivalent of the carboxylic acid component of the interpolymer.

The acrylic interpolymer is made from (1) about 0.5 to about 20 weight percent of a polymerizable monoethylenically unsaturated carboxylic acid, (2) at least one monomer selected from the group consisting of alkyl esters of acrylic acid or methacrylic acid, or dialkyl esters of maleic or fumaric acid, wherein the alkyl group contains 4 to 18 carbon atoms and (3) optionally, another monomer copolymerizable therewith. The acrylic interpolymer has a weight average molecular weight in the range of 10,000 to 500,000 and a glass transition temperature in the range of 0° C. to −75° C.

The chelate ester of orthotitanic acid has the formula

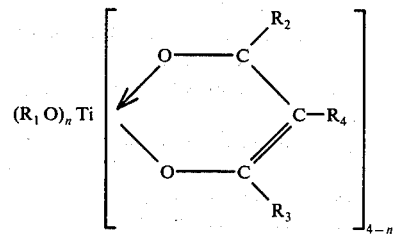

wherein $n$ is an integer of 2 or 3, $R_1$ is $C_2$ to $C_{10}$ alkyl, alkenyl, substituted alkyl or substituted alkenyl group, $R_2$ is $C_1$ to $C_6$ alkyl, alkoxy, alkenyl, or alkenoxy group, $R_3$ is a $C_1$ to $C_6$ alkyl or alkenyl group or a $C_6$ to $C_{10}$ aryl group and $R_4$ is hydrogen or a $C_1$ to $C_6$ alkyl or alkenyl group, and $R_2$ and $R_3$ may be combined as an ethylene or trimethylene group.

DESCRIPTION OF THE INVENTION

The interpolymer used in the pressure-sensitive adhesive compositions of this invention contains as one necessary component a polymerized ethylenically unsaturated carboxylic acid. Examples of such acids are acrylic acid, methacrylic acid, crotonic acid, maleic acid, fumaric acid, citraconic acid, itaconic acid and the alkyl monoesters of maleic acid, fumaric acid, citraconic acid and itaconic acid in which the alkyl group contains from one to eight carbon atoms, such as methyl, ethyl, butyl and octyl maleates. A preferred acid is acrylic acid. The amount of acid used in the interpolymer is from about 0.5 to about 20 weight percent based on the total weight of interpolymer, and, preferably, from about 2 to about 10 weight percent.

The second necessary monomer component of the interpolymer is at least one alkyl ester of acrylic or methacrylic acid wherein the alkyl group contains 4 to 18 carbon atoms or at least one dialkyl ester of maleic or fumaric acid wherein the alkyl group contains 4 to 18 carbon atoms. Examples of such esters are butyl acrylate, amyl acrylate, hexyl acrylate, octyl methacrylate, decyl acrylate, lauryl methacrylate, dibutyl maleate, di-2-ethylhexyl fumarate, 2-ethylhexyl, lauryl maleate, and the like. Preferred esters are isobutyl acrylate, 2-ethylhexyl acrylate and 2-ethylhexyl methacrylate. The amount of alkyl or dialkyl ester as hereinbefore described and used in the interpolymer will generally be at least about 40 weight percent up to about 99.5 weight percent, and, preferably, at least about 50 weight percent to about 80 weight percent, based on the weight of interpolymer.

Optionally, the interpolymer can contain another monomer copolymerizable with the polymerizable acid and polymerizable ester. Examples of this other monomer are vinyl esters of unsaturated carboxylic acids, e.g., vinyl acetate, vinyl propionate and vinyl butyrate, alkyl esters of acrylic or methacrylic acid wherein the alkyl group contain from 1 to 3 carbon atoms, e.g., methyl acrylate, ethyl acrylate, isopropyl acrylate, and methyl methacrylate, dialkyl esters of maleic or fumaric acid wherein each alkyl group contains from 1 to 3 carbon atoms, e.g., dimethyl maleate, diethyl maleate, and diisopropyl fumarate, acrylonitrile, methacrylonitrile and styrene. Additional monomers are monomers which contain hydroxyl groups, i.e., hydroxyalkyl acrylates and methacrylates wherein the alkyl group contains from 2 to 4 carbon atoms. Examples of such monomers are hydroxyethyl acrylate, hydroxypropyl methacrylate, hydroxybutyl methacrylate and the like. These other monomers copolymerizable therewith are used in the amount of 0 to 59.5 weight percent based on the weight of interpolymer and, preferably, 10 to 48 weight percent.

In preparing the interpolymers used in this invention, the monomers are used in such ratios that the glass transition temperature of the interpolymers is within the range of 0° C. to −75° C. A suitable ratio can be calculated from the equation $$\frac{1}{T_g} = \frac{W_1}{T_{g_1}} + \frac{W_2}{T_{g_2}} + \ldots \frac{W_n}{T_{g_n}}$$

wherein $T_g$ is the glass transition temperature of the interpolymer expressed as degrees Kelvin, $T_{g_1}$, $T_{g_2}$ etc. are the glass transition temperatures of the homopolymers of the respective comonomers and $W_1$, $W_2$ etc. are the weight fractions of comonomers required for a specific glass transition temperature of the interpolymer. Glass transition temperatures are determined experimentally by conventional methods such as by using the duPont Differential Thermal Analyzer.

The weight average molecular weight of the interpolymer is in the range of 10,000 to 500,000, corresponding to a relative viscosity of 1.3 to 8.0 measured on a solution of 2 grams of the interpolymer per deciliter of benzene. The preferred molecular weight range is from 20,000 to 300,000.

The interpolymers are conveniently prepared by organic solvent polymerization techniques well known in the art using heat activated free radical initiators.

The solvents used in the process of this invention are organic solvents, which are solvents for the interpolymer and which have boiling point ranges of from 50° C. to about 300° C. Examples of such solvents are benzene, toluene, xylene, ethyl acetate, isopropyl acetate, butyl acetate, acetone, methylethyl ketone, methylisobutyl ketone, hexane, heptane and the like. Additional solvents which are important in that they enhance the stability of the pressure-sensitive adhesive compositions of this invention, i.e., the storage stability of the interpolymers solution plus the chelate esters of orthotitanic acid, are alcohols. Examples of such alcohols are ethanol, isopropanol and butanol, as well as ethylene glycol monomethyl ether, ethylene glycol monobutyl ether, diethylene glycol monomethyl ether and the like. The solvents should contain as little water as possible, i.e., no more than about 2 weight percent of the total solvent weight.

The chelate esters of orthotitanic acid used in the pressure-sensitive compositions of this invention have the formula

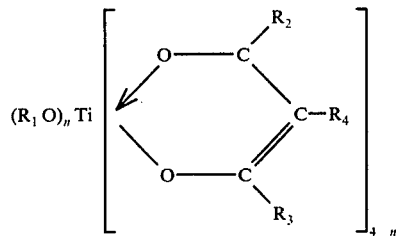

wherein $n$ is an integer of 2 or 3, $R_1$ is a $C_2$ to $C_{10}$ alkyl, alkenyl, substituted alkyl or substituted alkenyl group, $R_2$ is a $C_1$ to $C_6$ alkyl, alkoxy, alkenyl or alkenoxy group, $R_3$ is a $C_1$ to $C_6$ alkyl or alkenyl group or a $C_6$ to $C_{10}$ aryl group and $R_4$ is hydrogen or a $C_1$ to $C_6$ alkyl or alkenyl group, and $R_2$ and $R_3$ may be combined as an ethylene or a trimethylene group.

The chelate esters are prepared by conventional methods such as the addition of the appropriate chelating agent to an alkyl or alkenyl titanate wherein the alkyl or alkenyl group contains 2 to 10 carbon atoms. Among the chelating agents which can be used are acetylacetone, propionylacetone, benzoylacetone, 1,3-cyclopentanedione, 1,3-cyclohexanedione, alkyl acetoacetates, such as ethyl acetoacetate, and the alkyl and alkenyl substituted derivatives of these diketones and acetoacetates. When acetylacetone is used as the chelating agent, the $R_2$ and $R_3$ groups in the above formula are methyl and the $R_4$ group is hydrogen. The chelating agents can be reacted with the lower alkyl or alkenyl titanate in a molar ratio of from 1:1 to 2:1, the preferred ratio being 2:1. The alkanol generated by the reaction may be distilled or it can be left with the chelate as a solvent. A preferred chelate ester is dialkoxy titanium diacetylacetonate.

The amount of chelate ester used in the composition of this invention will vary from about 0.1 to about 4 parts by weight of the chelate ester per 100 parts by weight of the interpolymer and, preferably, about 0.5 to about 1 part.

In order to obtain better stability of the adhesive product, particularly to prevent the gelation of the interpolymer when the chelate ester is added, an excess of the chelating agent is included in the formulation of the composition. Small excesses in the order of about 0.5 to about 3 weight percent based on the total weight of interpolymer are utilized. The chelating agent can be added directly to the interpolymer solution or can be added to the solution of titanium chelate.

One of the problems with the pressure-sensitive adhesives which have been hereinbefore described are that in the presence of unprotected ferrous metal surfaces, a highly colored iron complex can develop which imparts an undesirable color to the adhesive composition. In addition, the metal surfaces can be corroded and gel particles can form at the metal surface. It has been found that a small amount of tertiary amine substantially prevents color formation, inhibits corrosion and retards gelation. The tertiary amine is added in the amount of about 0.01 to about 1.5 equivalents of amine for each carboxylic acid equivalent in the interpolymer, and, preferably, about 0.05 to about 0.5 equivalent.

The tertiary amines used in the composition of this invention have the formula

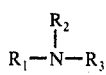

wherein $R_1$ is an alkyl radical containing 2 to 6 carbon atoms, $R_2$ and $R_3$ are alkyl radicals containing 1 to 6 carbon atoms or are hydroxyalkyl radicals containing 2 to 4 carbon atoms. Examples of such tertiary amines are triethylamine, dimethylethanol amine, tripropylamine, tributyl amine, dimethylbutyl amine and the like. Preferred amines are triethylamine and dimethylethanol amine.

The pressure-sensitive adhesive compositions of this invention can be used as the adhesive component in pressure-sensitive tapes, films and foams. They adhere well to resin surfaces such as plasticized poly(vinyl chloride) cellulose acetate, nylon, polyethylene, polypropylene and polyesters as well as to paper, metal, wood and painted surfaces.

The pressure-sensitive adhesive compositions are tested for adhesive properties using the following tests:

The samples are prepared by casting an adhesive coating on 1.5 mil polyester film with a Bird applicator at a coat weight of about 16 lbs./ream. The adhesive coated film is dried at 160° F. for 15 minutes. After cooling to room temperature, the adhesive is covered with release paper and is then cut into appropriate test samples.

The 0° Shear (Static shear adhesion test) is a test of the cohesive strength of the adhesive. Adhesive coated film is cut into strips 0.5 inch in width. The release paper is removed and a strip is applied to a stainless steel panel perpendicular to the panel's length. The strip is rolled with a 4.5 pound rubber-covered roller at a rate of 12 inches/minute, once in each direction. The strip is trimmed to give a length of 0.5 inch and, thus, a bonded area of 0.25 square inch. After allowing adhesion to build over a 30 minute lay-up time, the sample/panel laminate is placed in a shear adhesion test stand. A 500 gram weight is secured to the end of the sample strip. Shear strength is expressed as the time required for the weight to shear the sample from the panel.

The 180° Peel test is a measure of the adhesive properties of the adhesive. The adhesive coated film is cut into strips 1 inch in width which, after removal of the release paper, is applied to a stainless steel panel. The sample is then rolled with a 4.5 lbs. rubber roller at a rate of 30 inches per minute, once in each direction. After allowing adhesion to build over a 30 minute period, the adhesive is peeled from the substrate at a 180° angle at 12 inches per minute. The average strength in pounds per inch of width is determined.

The 90° Quick Stick test measures the ability of a pressure-sensitive adhesive to instantly adhere to a surface without external pressure. The adhesive coated film is cut into 1 inch wide strips, and after removal of the release paper, the strip is draped evenly over the surface of a stainless steel panel with no pressure being applied. About 2-3 inches of the strip are allowed to extend over the edge of the panel. The adhesive and panel are placed in the 90° test jig as soon as possible and the adhesive strength is measured at a rate of 12 inches per minute. The average strength in lbs. per inch of width is determined.

The following examples describe the invention in more detail. Parts and percentages where used are parts and percentages by weight unless otherwise noted.

EXAMPLE 1

To a suitable reactor were added 599 parts of denatured ethanol and 995 parts of ethyl acetate. Agitation was begun and heat was applied raising the temperature to reflux, about 160° F. A monomer catalyst mixture of 121 parts of acrylic acid, 640 parts of methyl acrylate, 1189 parts of 2-ethylhexyl acrylate and 1.43 parts of azobis(isobutyronitrile) was added to the reactor over a one hour period while keeping the temperature at reflux. Heating was continued at reflux, about 160° F., for 75 minutes, after which time a solution of 9.8 parts of azobis (isobutyronitrile) in 159 parts of ethyl acetate was added over a period of one hour. Heating at reflux was continued for 4 hours. At the end of this time, the temperature in the reactor was lowered to below 100° F., and a solution of 42 parts of triethylamine in 119 parts of n-hexane was added to the reactor. A mixture of 19.5 parts of a solution of 75 weight percent titanium diisopropyl diacetylacetonate in isopropyl alcohol, 58 parts of acetylacetone, 54 parts of ethyl acetate and 217 parts of n-hexane was added over a 60 minute period. n-Hexane, 22 parts, and 87 parts of ethyl acetate were then added to the reactor. After thorough mixing, the polymer solution was found to have a solids content of 45% and a viscosity, at 25° C., of 1200–1400 cps. The 0° Shear was greater than 24 hours, the 180° Peel, in lbs. per inch of width, was 2.9, and the 90° Quick Stick, in lbs. per inch of width, was 0.6.

An uncoated strip of steel was inserted into the pressure-sensitive adhesive to test the effect of the adhesive on the metal. After 1½ weeks at room temperature, no discoloration, corrosion, or gelling was noted. When stored for the same period at 140° F., only a slight darkening of the solution was noted. After 2 months at 140° F., the solution had turned dark brown in color but exhibited no change in viscosity or loss in adhesive properties. At 110° F., the adhesive solution showed no change in color after one month and a very slight darkening after 2 months.

The identical adhesive solution, except with no triethylamine, was tested at room temperature in the same manner as described above. The solution discolored badly in 1 day, the steel began to rust in 2 to 3 days and after 1 week, the titanate had deposited on the metal.

EXAMPLE 2

Using the same procedure as was described in Example 1, an interpolymer of 6.2 parts of acrylic acid, 32.8 parts of methyl acrylate and 61.0 parts of 2-ethylhexyl acrylate was prepared in 73.22 parts of ethyl acetate and 25.11 parts of denatured alcohol, followed by the addition of 0.5 parts of acetylacetone, 0.35 part of triethylamine and 0.82 part of a 75 percent solution, in isopropanol, of titanium diisopropyl diacetylacetonate. The solids content of the adhesive solution was 45% and the viscosity, at 25° C., was 1870 cps. The adhesive properties of the composition were: 0° Shear > 24 hrs; 180° Peel — 3.0 lbs. per inch of width; 90° Quick Stick — 0.52 lbs. per inch of width.

The adhesive solutions showed no discoloration or corrosion after being stored in unlined steel cans for 2 weeks. After being stored for 2 weeks at 140° F., the solution had darkened slightly (changed from a light yellow or orange) with no corrosion, gelation, or change in adhesive properties. The viscosity had increased slightly, from 1870 cps. to 2250 cps.

EXAMPLE 3

Using the same procedure as was described in the preceding Examples, an interpolymer of 6.2 parts of acrylic acid, 32.8 parts of methyl acrylate and 61.0 parts of 2-ethylhexyl acrylate was prepared in 73.04 parts of ethyl acetate and 25.11 parts of denatured ethanol. Acetylacetone, 0.5 part, triethylamine, 0.53 part and a 75 percent solution of titanium diisopropyl diacetylacetonate, 0.82 part, were added. The resulting adhesive composition had a solids content of 45% and a viscosity, at 25° C., of 1875 cps. The adhesive properties of the composition were: 0° Shear — > 24 hours; 180° Peel — 3.0 lbs. per inch of width; 90° Quick Stick — 0.52 lb. per inch of width.

The adhesive solutions exhibited no discoloration or corrosion after exposure to uncoated steel for 2 weeks. When stored for 2 weeks in uncoated steel cans at 140° F., the solution darkened slightly from a light yellow to light orange, but showed no corrosion, gelation or loss in adhesive properties.

It is to be understood that the foregoing detailed description is given merely by way of illustration and that many variations may be made therein without departing from the spirit of the invention.

What is claimed is:

1. In a pressure-sensitive adhesive composition which when dry forms a tacky adhesive of high cohesive strength, said composition being formed from an organic solvent solution of
   (A) an acrylic interpolymer made from
      (1) about 0.5 to about 20 weight percent of a polymerizable monoethylenically unsaturated carboxylic acid,
      (2) at least one monomer selected from the group consisting of alkyl esters of acrylic acid or methacrylic acid wherein the alkyl group contains 4 to 18 carbon atoms or dialkyl esters of maleic or fumaric acid wherein each alkyl group contains 4 to 18 carbon atoms and
      (3) optionally, another monomer copolymerizable therewith,
   wherein the interpolymer has a weight average molecular weight in the range of 10,000 to 500,000 and a glass transition temperature in the range of 0° C. to −75° C., and
   (B) a chelate ester of orthotitanic acid having the formula

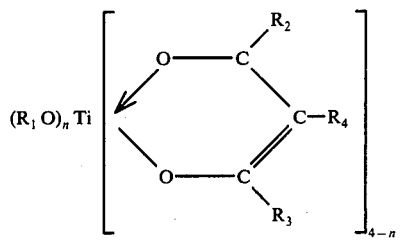

wherein $n$ is an integer of 2 or 3, $R_1$ is $C_2$ to $C_{10}$ alkyl, alkenyl, substituted alkyl or substituted alkenyl group, $R_2$ is $C_1$ to $C_6$ alkyl, alkoxy, alkenyl, or alkenoxy group, $R_3$ is a $C_1$ to $C_6$ alkyl or alkenyl group or a $C_6$ to $C_{10}$ aryl group, and $R_4$ is hydrogen or a $C_1$ to $C_6$ alkyl or alkenyl group, and $R_2$ and $R_3$ may be combined as an ethylene or trimethylene group;

the improvement which comprises the addition to said adhesive composition of a tertiary amine in the amount of about 0.01 to about 1.5 equivalents of amine per each carboxylic acid equivalent in the interpolymer.

2. The composition of claim 1, wherein about 0.05 to about 0.5 equivalent of amine is present for each carboxylic acid equivalent in the interpolymer.

3. The composition of claim 1 wherein the tertiary amine has the formula

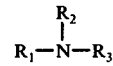

wherein $R_1$ is an alkyl radical containing 2 to 6 carbon atoms, $R_2$ and $R_3$ are alkyl radicals containing 1 to 6 carbon atoms or are hydroxyalkyl radicals containing 2 to 4 carbon atoms.

4. The composition of claim 1 wherein the tertiary amine is triethylamine.

5. The composition of claim 1 wherein an excess of chelating agent is present in the composition.

6. The composition of claim 5 wherein the excess chelating agent is about 0.5 to about 3 weight percent based on the weight of the interpolymer.

7. The composition of claim 1 wherein $R_2$ and $R_3$ of the chelate ester of orthotitanic acid are methyl groups and $R_4$ is hydrogen.

* * * * *